United States Patent [19]
Weistrop

[11] 3,831,316
[45] Aug. 27, 1974

[54] MULTI-FIGURE ZIPPER TOY BAG

[76] Inventor: Elizabeth N. Weistrop, 505 Dolores Ave., Half Moon Bay, Calif.

[22] Filed: June 14, 1973

[21] Appl. No.: 370,130

[52] U.S. Cl................................... 46/153, 46/157
[51] Int. Cl............................................. A63h 3/12
[58] Field of Search............ 46/153, 151, 156, 158, 46/; 35/8 R, 56; 150/1.7

[56] References Cited
UNITED STATES PATENTS

| | | | |
|---|---|---|---|
| 2,682,290 | 6/1954 | Ditlea | 150/1.7 |
| 3,501,862 | 3/1970 | Austin | 46/158 |
| 3,546,789 | 12/1970 | Kushell et al. | 46/153 |
| 3,715,816 | 2/1973 | White | 35/8 R |

Primary Examiner—Louis G. Mancene
Assistant Examiner—J. Q. Lever
Attorney, Agent, or Firm—Townsend and Townsend

[57] ABSTRACT

A children's toy comprising a plurality of selectably interchangeable figure images disposed on a common piece of fabric or similar pliant material. Each of the figure images has at least one pair of mating zipper tracks disposed along opposite portions of the image periphery. Any one of the available figure images may be developed into a corresponding three-dimensional figure form by gathering the material exterior of the selected image so as to be enveloped within the selected image and capturing it therein by engagement of the confronting zipper tracks to form a bag with the selected image on the exterior surface. Figures having more complex shapes can be formed by using multiple zippers and preformed body members attached to the base material. The available figure images may be chosen so that the sequence of figure formation by the child may correspond, for example, to the development of a story or to some natural phenomenon.

8 Claims, 25 Drawing Figures

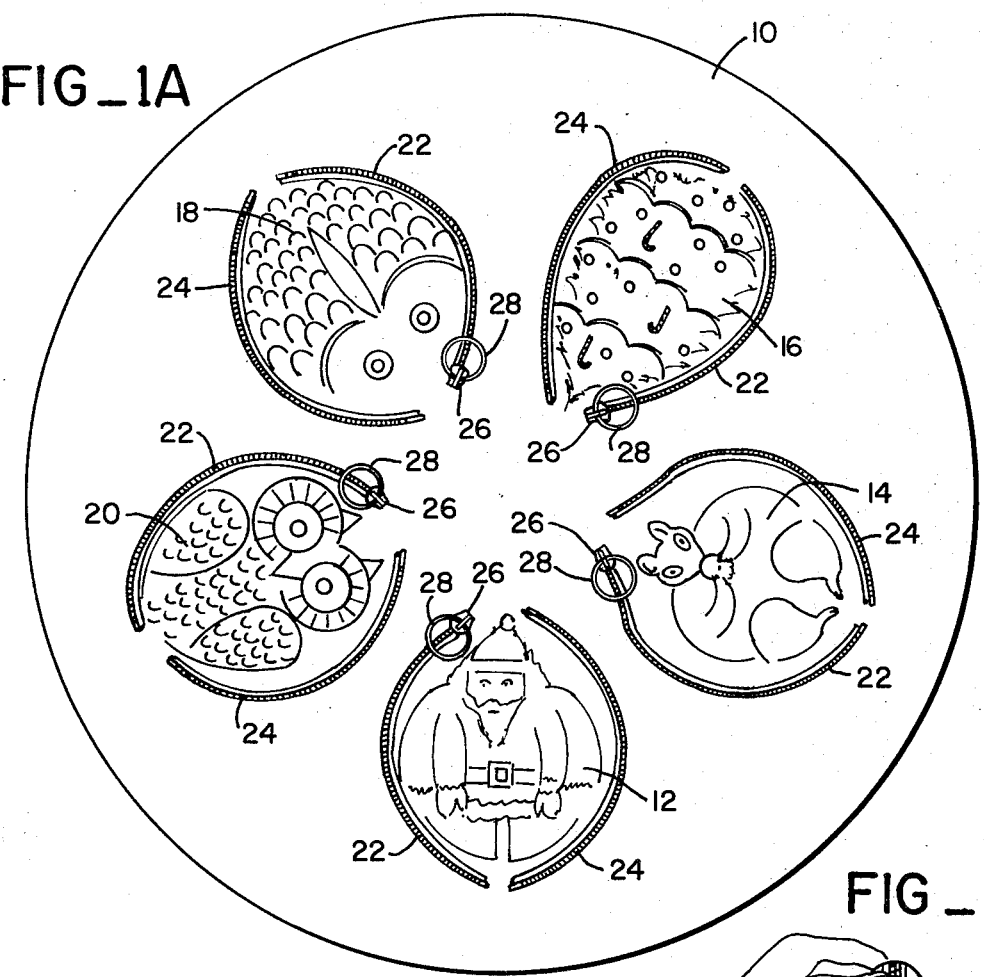
FIG_1A
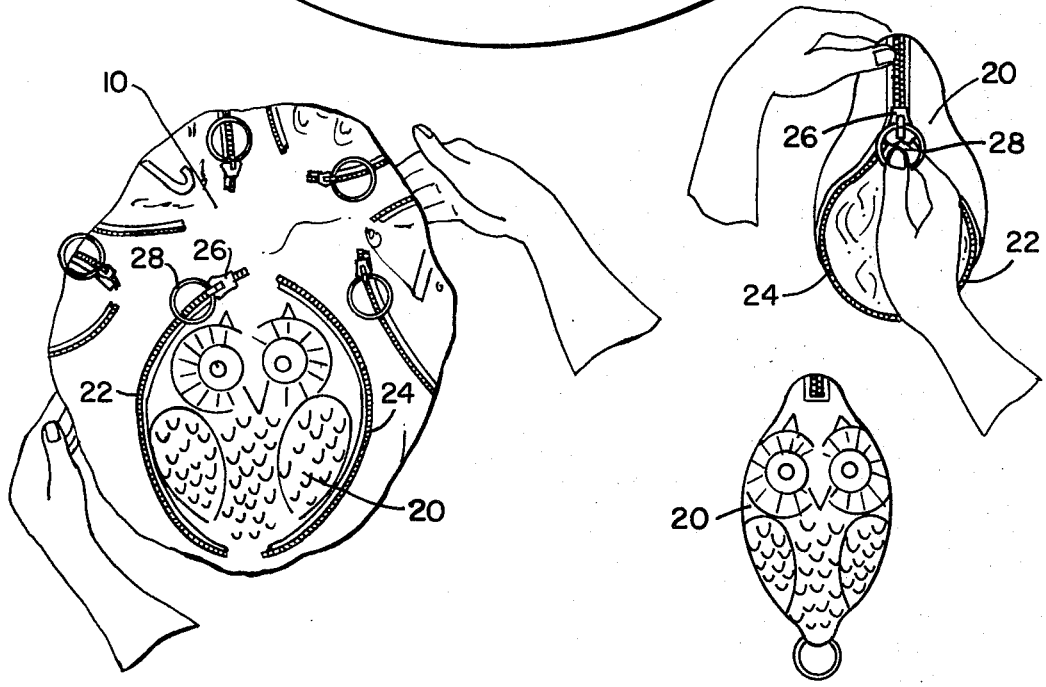
FIG_1B
FIG_1C
FIG_1D

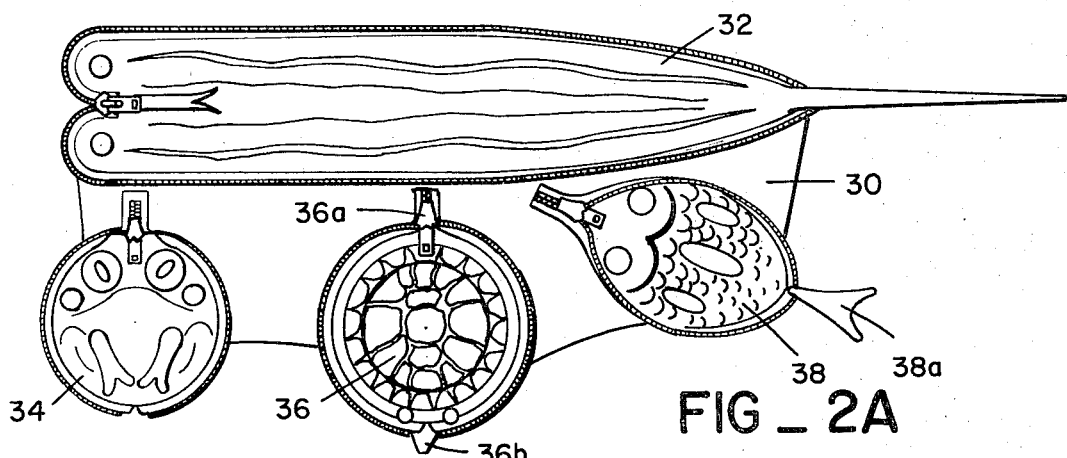
FIG_2A
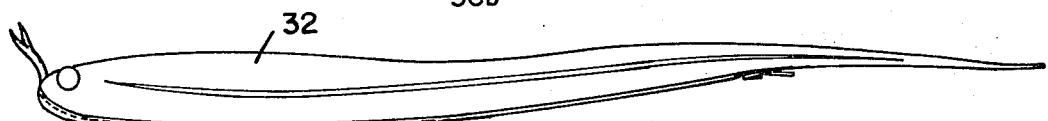
FIG_2B
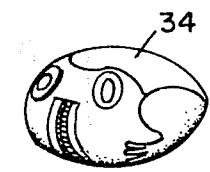
FIG_2C
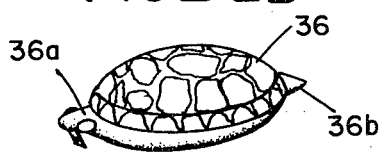
FIG_2D
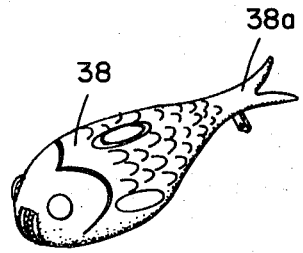
FIG_2E
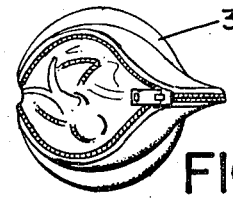
FIG_2F
FIG_2G
FIG_2H
FIG_2I

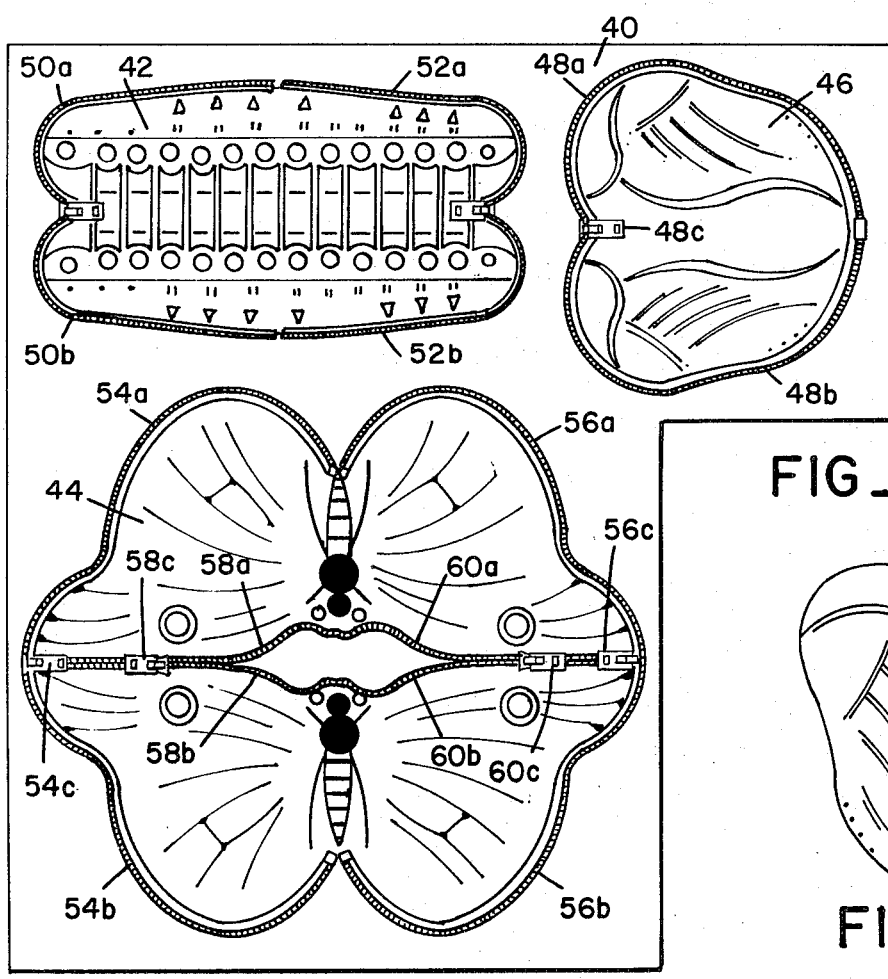
FIG_3A
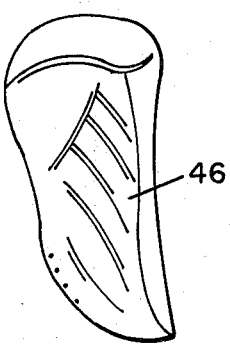
FIG_3B
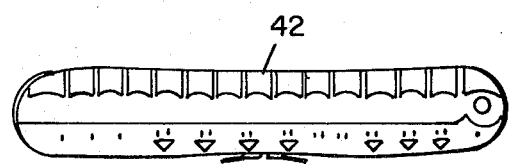
FIG_3C
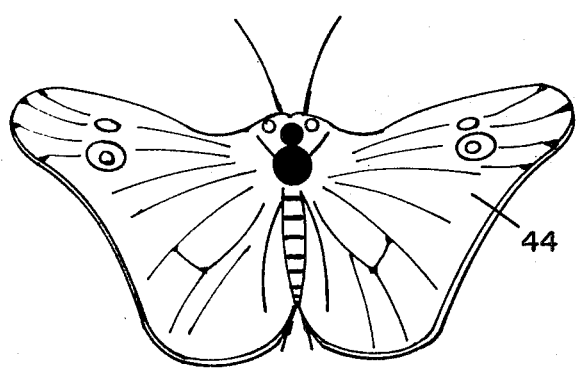
FIG_3D
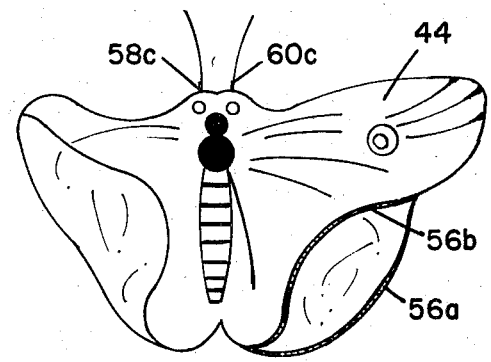
FIG_3E

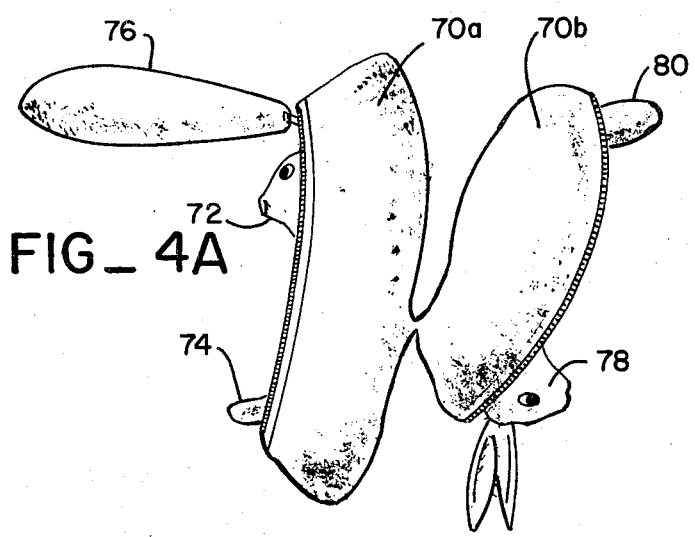
FIG_4A
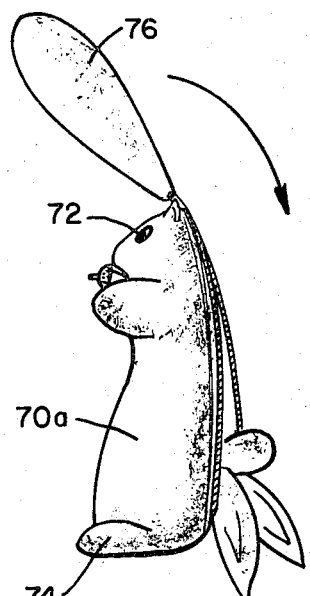
FIG_4B
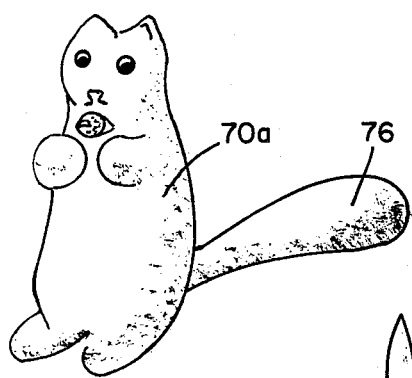
FIG_4C
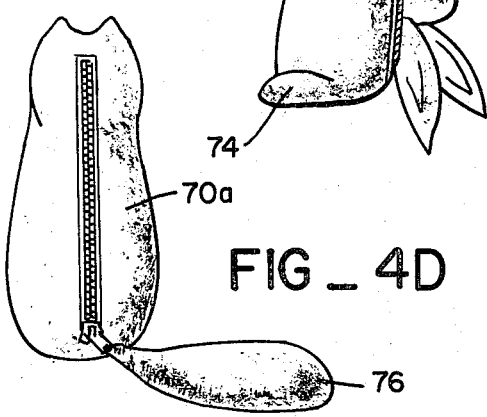
FIG_4D
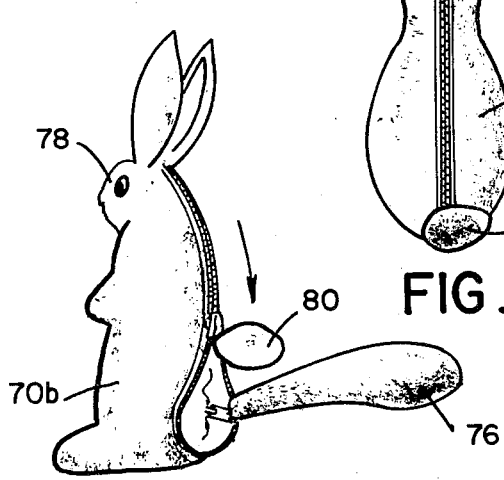
FIG_4E
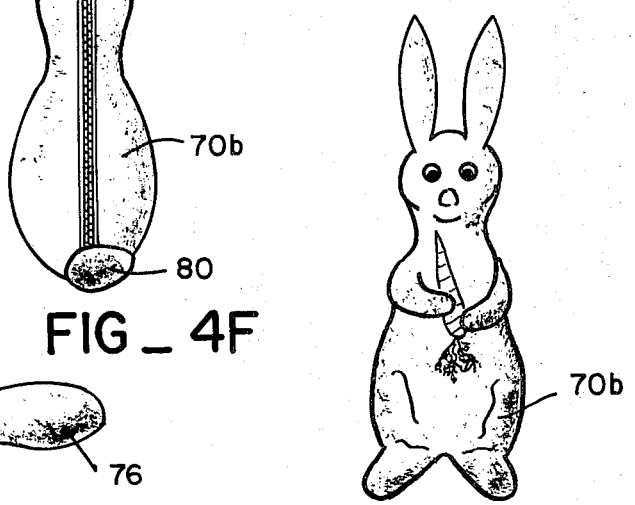
FIG_4F
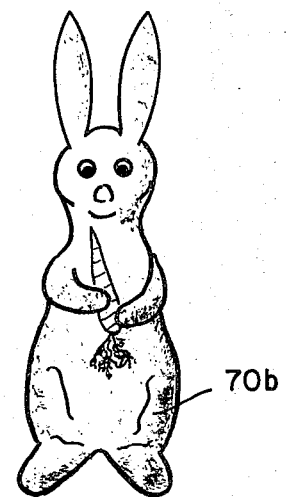
FIG_4G

3,831,316

MULTI-FIGURE ZIPPER TOY BAG

BACKGROUND OF THE INVENTION

The present invention relates to children's amusement devices and is more particularly directed to a zipper-bag fabric toy capable of assuming a figure form selected by the child from among a variety of interchangeable figure images available on the same piece of fabric.

It is well known that children derive the greatest pleasure and amusement from playthings whose shape, form or appearance is to some degree controllable by them. Conventional fabric toys of the doll or stuffed animal variety typically have a single external form or appearance which is unalterable by the child. The advantages of allowing the child to select and form a figure from among several available to him as been recognized by the prior art. For example, U.S. Pat. No. 2,347,405 issued to G. C. Ford, describes a toy wherein a number of doll image envelopes may be selectively placed about a common deformable inner form (i.e., stuffing) member.

The present invention motivates a child to an even greater degree of participation and involvement in the image creation process, and additionally results in development of manual dexterity as well as intellectual skills such as spatial relationships and creativity. The toy of the present invention also possesses obvious advantages in terms of safety, economy, versatility and appeal to a wide age group. The zipper bag toy has a further advantage over conventional toys of the same general type in that it may be easily laundered in its undeveloped form.

SUMMARY OF THE INVENTION

According to one embodiment of the present invention, a unitary section of cloth fabric or similar soft deformable material is provided having a number of figure images imprinted or otherwise placed thereon. Around the periphery of each of the figure images is one or more conventional zipper fastenings comprising two mating tracks. The zipper is sewn face down on the fabric in such a way that the remaining material outside the periphery of each of the figure images may be gathered into a compact shape, enveloped by a selected figure image and secured by engagement of the mating zipper halves to form a three-dimensional figure form.

The figure images may be chosen and arranged so that their selection by the child follows some logical development which may correspond, for example, to the plot of a children's storybook, or which may simulate some developmental process in nature such as the insect metamorphosis from caterpiller to cocoon to butterfly. Various other applications of the basic concept of the present invention will occur to the reader and those shown herein are by way of illustration only and not intended to be exhaustive or restrictive. These objects, features and advantages of the present invention mentioned above, as well as others not explicitly stated, will become more readily apparent in light of the following detailed description with reference to the accompanying drawings.

DESCRIPTION OF THE DRAWINGS

FIGS. 1A through 1D pictorially illustrate the development of a selected figure form according to one embodiment of the present invention wherein the available images are representative of seasonal objects;

FIGS. 2A through 2I illustrate development of selected figure forms according to another embodiment wherein the available figure images represent marine, amphibious and reptile creatures of differing shapes;

FIGS. 3A through 3E illustrate development of selected figures according to a further embodiment wherein the available figure images represent a caterpillar, cocoon and butterfly and the more complex shapes are formed using multiple zippers; and FIGS. 4A through 4G pictorially illustrate development of selected figures according to an embodiment of the invention wherein a shaped base material is used with prestuffed body members attached.

DETAILED DESCRIPTION OF THE INVENTION

Referring now to the drawings, with specific reference to FIGS. 1A through 1D, an embodiment of the present invention is depicted wherein a variety of images can be selectively developed into three-dimensional figure forms commonly associated with a particular time of year or holiday season.

FIG. 1A illustrates the fabric toy in a substantially planar form prior to the development of a selected three-dimensional figure. A flat piece of cloth fabric or similar pliant material 10 provides the base medium on which a plurality of figure images 12 through 20 are disposed. It is to be understood that while the overall shape of the base material 10 is shown in FIG. 1A as being generally circular, any other regular or irregular outline may be employed. Figure images 12 through 20 are placed on one side of base material 10 by any appropriate method such as embroidering, imprinting the images directly on the base medium or sewing individual cloth patches representing the various images onto a common fabric. The term "figure image" will be used herein to refer to an individual figure representation on its undeveloped substantially two-dimensional form and the term "figure form" will be used to refer to the fully developed three-dimensional zipper bag having the selected image on the exterior surface thereof.

The individual figure images illustrated in FIG. 1A include a Santa Claus image 12, a squirrel image 14, a Christmas tree image 16, a fish image 18 and an owl image 20. Around the periphery of each of the images 12 through 20 is disposed a mating pair of zipper tracks 22 and 24 sewn directly onto base material 10. A zipper closure member or slider 26 is permanently attached to zipper track 22 and is engageable with zipper track 24. A pull ring 28 is attached to closure member 26 so that it may be easily moved to bring the zipper tracks 22 and 24 into mating engagement. Zipper tracks 22 and 24 are sewn onto the base material 10 in such a way that the mating edges of the teeth are disposed outwardly from the image so that when the surrounding fabric peripheral to the image is enveloped thereby the two zipper halves can be brought around toward one another and engaged capturing the material within the image to create a three-dimensional figure form with the image on the exterior surface.

The manner in which the toy of the present invention operates to form a three-dimensional figure form is illustrated in the sequence shown by FIGS. 1B through 1D. First, as shown in FIG. 1B the base material 10 is gathered and folded behind a selected image such as owl image 20. Since the piece of cloth 10 is pliant and easily deformable, the gathering operation can be performed by simply compressing the cloth into a compact mass around which the image is enveloped. After the portion of base material 10 peripheral to the selected image has been fully gathered and compressed behind the selected figure closure member 26 on zipper track 22 is engaged with mating zipper track 24. Since cloth 10 has been fully gathered behind selected figure image 20 zipper tracks 22 and 24 can be joined and the zipper closed by means of pull ring 28 as shown in FIG. 1C. When the zipper tracks are fully engaged figure image 20 completely encloses the peripheral fabric forming a stuffed three-dimensional owl figure form as illustrated in FIG. 1D.

In the embodiment of the present invention illustrated in FIGS. 1A through 1D a zipper arrangement is the preferred connecting means used to form the three-dimensional figure forms. However, it will be apparent that other fastening means such as snaps, buttons, velcro, etc., could be used in substitution, or as a supplement to zippers. For example, buttoned figures could be used to teach young children how to fasten their coats providing a useful educational device which is at the same time amusing for the children.

A more complex embodiment of the present invention is illustrated by reference to FIGS. 2A through 2I. In this arrangement base material 30 of cloth or other flat pliant material is cut into a complex shape as illustrated. As in the embodiment of FIGS. 1A through 1D a single common piece of material is used as the substrate on which the various figure images are disposed. The arrangement shown illustrates the manner in which figure forms having widely differing shapes may be developed from the same common base material. For example, figure image 32 when developed forms the three-dimensional elongated body of a snake or eel as illustrated in FIG. 2B. Similarly, figure images 34 and 36 when developed respectively form frog and turtle figures which are generally egg-shaped as shown in FIGS. 2C and 2D. Finally, figure image 38 is developed into a tear-dropped fish figure as shown in FIG. 2E. FIG. 2F corresponds to FIG. 1C and illustrates the material peripheral to turtle image 36 enveloped by the image and captured therein by the partially engaged zipper. FIGS. 2G through 2I illustrate the figure development of snake image 32. The arrangement shown also illustrates the use of small pieces of material exterior of the encircling zipper tracks which are placed so as to form pertuberant portions or projections on the completed figure form for added realism. For example, turtle figure image 36 is provided with projections 36a and 36b at either end so that a turtle having both nose and tail is formed as illustrated in FIG. 2D. Similarly, fish image 38 is provided with an elongate portion 38a external to the zipper tracks to form a tail as shown in FIG. 2E. In addition, objects such as buttons may be sewn onto the figure image at appropriate locations to represent the eyes or other physical features or markings of the creature depicted.

As illustrated by FIGS. 2A through 2I several different figures having widely varying shapes can be formed from a single flat piece of base material. It will be noted, however, that each of the figures is formed in essentially the same manner, namely, enveloping the portion of the base material peripheral to the selective image within the image and engaging the zipper or other closure to capture the material therein and complete the three-dimensional figure. It will be appreciated that the degree of conformation of the zipper tracks or other closure means to the image outline to a large extent determines the shape of the figure formed.

An embodiment of the present invention wherein multiple zipper fastenings are used to form objects having more complex shapes is illustrated by way of reference to FIGS. 3A through 3E. In this arrangement a variety of figure images are again contained on a flat sheet 40 of cloth or similar flexible material. In this embodiment the figures are chosen to represent the insect life cycle from caterpillar 42 to butterfly 44 through the transitional stage of cocoon 46. Cocoon figure image 46 utilizes a single zipper fastening 48 as in the embodiments previously discussed, while caterpillar figure image 42 employs two zippers 50 and 52 and butterfly image 44 is provided with four zippers 54–60 in order to generate its more complex figure form. Further, it will be noted that while in the embodiment of FIGS. 2A through 2I the exterior boundry of the base material was to a large extent coextensive with the outlines of the individual figure images, in the embodiment of FIGS. 3A through 3E the images are totally internal to the outline of the base material. Thus, relatively complex figure forms may be developed either through the expedient of utilizing a portion of the figure image periphery as the boundry or outline of the underlying base material, or by utilizing a plurality of zippers or other fastenings as in FIGS. 3A–3E. Cocoon image 46 employs a single zipper fastening comprising zipper tracks 48a and 48b and closure 48c to form the three-dimensional figure shown in FIG. 3B. Zipper tracks 50a–b and 52a–b are used to shape figure image 42 into the elongate shape caterpillar figure illustrated in FIG. 3C. Four zippers 54a–b through 60a–b associated with butterfly image 44 are used to form the relatively complex figure form illustrated in FIGS. 3D and 3E, with the zipper closure tabs 58c and 60c used to form the antennae of the butterfly. Even with these increasingly complex shapes, however, it will be seen that the manner of figure form development is essentially identical to the single zipper arrangement previously discussed.

FIGS. 4A through 4G illustrate an embodiment of the present invention wherein figures having more complex shapes can be developed by utilizing a shaped rather than a planar base material having preformed body members attached. A rabbit/squirrel toy is shown in its undeveloped form in FIG. 4A. The base material in this case comprises two sections of fabric 70a and 70b, the undersides of which are joined along a small area. As will be seen this side of the fabric will be on the inside when the corresponding figure is fully developed. The opposite sides of sections 70a and 70b respectively form the exterior of the squirrel and rabbit forms when the selected figure is developed.

A variety of preformed body features are appropriately attached to the exterior surfaces of the shaped material. For example, fabric section 70a which forms the squirrel figure has attached to its exterior surface prestuffed body features such as head 72 and feet 74, while fabric section 70b which forms the rabbit figure has attached to its exterior surface head 78 and similar prestuffed members representing the animal's feet. The animals' tails are attached not to the base material but to the zipper pull tabs. Thus, squirrel tail 76 and rabbit tail 80 provide both a utilitarian function in developing the figures and an aesthetic function adding realism to the developed animal.

In operation the fully developed figure of either the two available animals is formed by enveloping the base material of the non selected animal and its attached body feature members with the base material section corresponding to the selected animal and engaging the associated zipper. For example, to form the fully developed squirrel figure shown in FIGS. 4C and 4D base material section 70a as shown in FIG. 4A is reversed and enveloped around section 70b and its attachments. Section 70a as thus reversed contains on its exterior surface the torso and attached body members of the squirrel figure. This stage of development corresponds to that shown in section 4B where the ears and tail of the non selected rabbit figure are shown partially protruding from within the squirrel envelope. The rabbit figure shown in FIGS. 4F and 4G is similarly formed by envelopment of the squirrel fabric 70a and its attachments with rabbit section 70b and engaging the associated zipper. FIG. 4E illustrates the rabbit figure as it nears full development with the squirrel tail protruding from within the envelope. This member will of course be inserted within the envelope prior to full engagement of the zipper.

While several embodiments of the present invention having varying degrees of complexity and detail have been illustrated above it will be noted that the underlying inventive principle has remained the same. It is further apparent that numerous embodiments of the present invention based on the same principle will be perceived by persons skilled in the art and that various modifications and adaptations can be introduced. However, it is to be understood that such modifications and adaptations are within the scope of the present invention as set forth in the following claims.

What is claimed is:

1. A children's toy comprising a unitary sheet of pliant base material having a plurality of visual figure images thereon and fastening means associated with each of said figure images said fastening means including at least one pair of mating elements disposed along opposite portions of the image periphery and being positioned for mating engagement when that portion of said base material exterior of the associated figure image is enveloped thereby to form a three-dimensional figure form.

2. The toy of claim 1 wherein said fastening means further comprise at least one pair of mating zipper tracks attached to said base material along opposed portions of said image periphery.

3. The toy of claim 2 wherein said zipper tracks are all interior of the base material periphery.

4. The toy of claim 2 wherein portions of said zipper tracks are coextensive with the base material periphery.

5. The toy of claim 2 further including additional mating zipper tracks attached to said base material and positioned interior of the associated figure image periphery.

6. The toy of claim 2 wherein said base material comprises two sheets joined along a portion of one of their surfaces and wherein the figure image associated with each of said sheets is disposed on the other surface thereof.

7. The toy of claim 6 further including preformed body members attached to said other surfaces of said sheets.

8. A method of forming a three-dimensional children's fabric toy from a substantially two-dimensional sheet of base material:
   a. providing a sheet of pliant base material having disposed thereon a plurality of visual figure images and fastening means associated with each of said figure images and including at least one pair of mating elements disposed along corresponding portions of the image periphery;
   b. gathering the portion of said base material exterior of a selected image into a compact shape and enveloping said compact shape within said selected figure image so as to bring said mating elements into confronting engageable proximity;
   c. engaging said elements to capture the portion of said base material exterior of said figure image therewithin and to form a zipper bag with the selected image on the exterior surface thereof.

* * * * *